United States Patent
Haramaty et al.

(10) Patent No.: US 11,956,160 B2
(45) Date of Patent: Apr. 9, 2024

(54) END-TO-END FLOW CONTROL WITH INTERMEDIATE MEDIA ACCESS CONTROL SECURITY DEVICES

(71) Applicant: Mellanox Technologies, Ltd., Yokneam (IL)

(72) Inventors: Zachy Haramaty, Hemed (IL); Liron Mula, Hertzlia (IL); Alon Singer, Tel Aviv (IL); Eduard Kvetny, Rishon LeZion (IL); Aviv Kfir, Nili (IL)

(73) Assignee: Mellanox Technologies, Ltd., Yokneam (IL)

( * ) Notice: Subject to any disclaimer, the term of this patent is extended or adjusted under 35 U.S.C. 154(b) by 269 days.

(21) Appl. No.: 17/336,080

(22) Filed: Jun. 1, 2021

(65) Prior Publication Data

US 2022/0385590 A1   Dec. 1, 2022

(51) Int. Cl.
    *H04L 47/35*   (2022.01)
    *H04L 9/40*    (2022.01)
    *H04L 45/00*   (2022.01)
    *H04L 47/10*   (2022.01)
    *H04L 49/90*   (2022.01)

(52) U.S. Cl.
    CPC ........... *H04L 47/35* (2013.01); *H04L 45/22* (2013.01); *H04L 47/39* (2013.01); *H04L 49/90* (2013.01); *H04L 63/0428* (2013.01); *H04L 63/164* (2013.01)

(58) Field of Classification Search
    None
    See application file for complete search history.

(56) References Cited

U.S. PATENT DOCUMENTS

| | | | |
|---|---|---|---|
| 11,265,301 B1* | 3/2022 | Gupta | H04L 63/067 |
| 2006/0136715 A1* | 6/2006 | Han | H04L 9/3242 |
| | | | 713/151 |
| 2009/0327695 A1* | 12/2009 | Molsberry | H04L 63/20 |
| | | | 713/153 |

(Continued)

FOREIGN PATENT DOCUMENTS

| | | |
|---|---|---|
| CN | 103209072 A | 7/2013 |
| CN | 106657278 A | 5/2017 |

(Continued)

OTHER PUBLICATIONS

U.S. Appl. No. 63/199,058, filed Dec. 4, 2020, Branscomb et al. "PHY MACsec with TSN Constant Latency", corresponding to PGPUB US2022/0179997A1.*

(Continued)

*Primary Examiner* — Gregory B Sefcheck
(74) *Attorney, Agent, or Firm* — Lowenstein Sandler LLP (57) ABSTRACT

An apparatus includes an input interface to receive incoming packets from a first network device and an output interface to send outgoing packets to a second network device. Media access control security (MACsec) circuitry is coupled between the input interface and the output interface. Bypass flow-control (FC) circuitry is coupled between the input interface and the MACsec circuitry. The bypass FC circuitry is to detect an FC packet in the incoming packets and pass the FC packet passively to the output interface to enable end-to-end flow control directly between the first network device and the second network device.

22 Claims, 5 Drawing Sheets

(56) References Cited

U.S. PATENT DOCUMENTS

| | | | | |
|---|---|---|---|---|
| 2010/0153550 | A1* | 6/2010 | Diab | H04L 12/40032 709/225 |
| 2010/0229013 | A1* | 9/2010 | Diab | H04L 63/16 709/224 |
| 2013/0114601 | A1* | 5/2013 | Branscomb | H04J 3/0697 370/392 |
| 2013/0117856 | A1* | 5/2013 | Branscomb | H04L 63/123 726/26 |
| 2014/0092918 | A1* | 4/2014 | Jost | H04J 3/0661 370/465 |
| 2019/0097745 | A1 | 3/2019 | Mallela et al. | |
| 2019/0166134 | A1* | 5/2019 | Tzeng | H04L 63/1425 |
| 2019/0173860 | A1* | 6/2019 | Sankaran | H04L 63/0272 |
| 2020/0076524 | A1* | 3/2020 | Demchenko | H04J 3/0667 |
| 2020/0143088 | A1* | 5/2020 | Sunkavalli | H04L 63/0428 |
| 2021/0288945 | A1* | 9/2021 | Branscomb | H04L 63/126 |
| 2022/0159013 | A1* | 5/2022 | Zimmerman | H04L 69/22 |
| 2022/0179997 | A1* | 6/2022 | Branscomb | H04L 47/245 |
| 2022/0217123 | A1* | 7/2022 | Gordon | H04L 63/164 |

FOREIGN PATENT DOCUMENTS

| | | |
|---|---|---|
| CN | 107819685 A | 3/2018 |
| CN | 108353026 A | 7/2018 |
| CN | 110891026 A | 3/2020 |

OTHER PUBLICATIONS

"Software flow control" Wikipedia, last edited Jan. 4, 2020, retrieved from https://en.wikipedia.org/w/index.php?title=Software_flow_control&oldid=934101257, 3 pages.

"Ethernet flow control" Wikipedia, last edited Jan. 28, 2020, retrieved from https://en.wikipedia.org/w/index.php?title=Ethernet_flow_controls&oldid=1003357352, 4 pages.

"RDMA over Converged Ethernet" Wikipedia, last edited Jan. 30, 2021, retrieved from https:en.wikipedia.org/w/index.php?title=RDMA_over_Converged_Ethernet&oldid=1003823542, 5 pages.

"Open Compute Project" Facebook Minipack 128×100GT Switch System Specification, Feb. 10, 2019, 256 pages.

"Understanding Media Access Control Security (MACsec)," Juniper Networks—TechLibrary, Dec. 14, 2020, retrieved from https://www.juniper.net/documentation/en_US/jjunos/topics/concept/macsec.html, 12 pages.

Sarazin, L.et al., "Enhancing Network Security with MACsec (IEEE 802.1AE)" Jan. 23, 2019, retrieved from https://www.curtisswrightds.com/news/blog/enhancing-network-security-with-macsec.html, 4 pages.

Zhou., "Research of the MACSec Safe Protocol Based on EPON," Optical Communication Technique, 2008, vol. 10. (machine translation attached).

* cited by examiner

END-TO-END FLOW CONTROL WITH INTERMEDIATE MEDIA ACCESS CONTROL SECURITY DEVICES

TECHNICAL FIELD

At least one embodiment pertains to processing resources used to perform and facilitate network communication. For example, at least one embodiment pertains to technology for end-to-end flow control with intermediate media access control security (MACsec) devices.

BACKGROUND

Network devices (e.g., switches, routers, hubs, end-points, and the like) perform flow control (also referred to as software flow control) to coordinate the transmission and reception of network packets (e.g., data packets, flow control packets, and the like). At times, the receiving network device cannot process the network packets at the speed of transmission and thus buffers the network packets in a buffer, e.g., memory such as cache or other non-volatile memory. When the buffer is nearly full, the receiving network device sends a transmit-off code (e.g., XOFF) to tell the transmitting network device to stop sending packets. When the bandwidth frees up (e.g., the buffer clears out enough), the receiving network device sends a transmit-on code (e.g., XON) to tell the transmitting network device to resume sending packets. The buffer helps with reducing interruption in network communication (e.g., stopping and starting the transmission of packets because the receiving network device is bottlenecked), and thus many network devices include increasingly larger buffers as network speeds increase. Large buffers, however, make network devices larger and more costly.

BRIEF DESCRIPTION OF DRAWINGS

Various embodiments in accordance with the present disclosure will be described with reference to the drawings, in which.

DETAILED DESCRIPTION

As described above, large buffers employed for flow control in fast networks increase the size and costs of network devices. Media access control security (MACsec) capability (e.g., in the form of circuitry, integrated chips (ICs), and devices) has been added to many network devices (or circuits) in order to provide end-to-end network security in different types of networks. For example, MACsec is a network security standard that operates at the medium access control layer and defines data confidentiality and integrity for media access independent protocols. Thus, MACsec can provide point-to-point security on Ethernet links (generally referred to as network links herein), and be defined by the Institute of Electrical and Electronics Engineers (IEEE) standard 802.11AE. Further, MACsec can be used in combination with other security protocols, such as Internet Protocol Security (IPsec) and Secure Sockets Layer (SSL) to provide this end-to-end network security.

In at least some embodiments, MACsec can identify and prevent most security threats, including denial of service, intrusion, man-in-the-middle, masquerading, passive wiretapping, and playback attacks. To do so, MACsec secures an Ethernet link for almost all traffic, including frames from the Link Layer Discovery Protocol (LLDP), Link Aggregation Control Protocol (LACP), Dynamic Host Configuration Protocol (DHCP), Address Resolution Protocol (ARP), and other protocols that are not typically secured on an Ethernet link because of limitations with other security solutions. Thus, MACsec circuitry is expected to continue to grow with the expansion of Internet of Things (IoT) and other network-enabled devices. One of the primary use cases for MACsec is to secure a local area network (LAN) with multiple machines, and in particular to secure traffic over Ethernet on Layer 2 LAN networks. In order to implement MACsec functionality between a switch and connected end-points (such as PC clients, IoT devices, and the like), devices can use a standardized negotiation protocol called MACsec Key Agreement (IEEE 802.1X-2010).

While MACsec circuitry can be integrated within a network device (e.g., be coupled to a network circuit within the network device), there are advantages to keeping the MACsec circuitry separate from the network device. For example, MACsec circuitry is specialized, can be efficiently manufactured separately as an IC or a MACsec device, and some legacy network devices may not already include MACsec circuitry. In these embodiments, a MACsec circuit or device (referred to generally hereafter as "device") can be coupled between the network device and a network connection source or other network devices. As a result, each MACsec device provides end-to-end security for the network device to which the MACsec device is coupled and the network devices need not be redesigned or remanufactured to include MACsec circuitry.

One challenge to employing the MACsec circuitry in a separate IC or device is dealing with flow control. In at least some embodiments, in order for each MACsec device (or circuit) to appropriately perform flow control, a separate buffer is needed for the MACsec device in order to buffer (e.g., temporarily store) some network packets as other network packets are being authenticated, integrity checked, and optionally encrypted or decrypted. As discussed previously, these buffers are getting larger, e.g., in the range of hundreds of kilobytes (KB) per channel. So, for example, if there are multiple (e.g., eight) channels, then the buffer for a given network device would need to be more than 100 megabytes (MB). As network speeds continue to increase and more bandwidth is demanded, these buffers are expected to become hundreds of megabytes in size or larger. This means greatly expanding the hardware footprint and the cost of MACsec devices deployed as a security augmentation to network devices. Further, even if a MACsec circuit is integrated within the network device in some way, the MACsec circuit will require a buffer, whether a separate buffer or use of buffers that belong to the network device, continuing to expand the buffer footprint in (or in relation to) network devices.

Aspects and embodiments of the present disclosure address these and other challenges by enabling network devices to add an additional interpacket gap (IPG) to that already added by the network devices (e.g., in accordance with IEEE 802.3 protocol) between transmitted network packets. Adding the additional IPG can make room for MACsec functionality within a network link while keeping the transmission lossless, e.g., without losing a packet and without pausing transmission. In some embodiments, this additional IPG can be between 24 and 32 bytes, for reasons that will be discussed, although different amounts of IPG are envisioned depending on the future of the MACsec standard.

According to further aspects and embodiments, the present disclosure also discusses the inclusion of, within a MACsec device (or circuit), bypass flow-control (FC) circuitry that is adapted to detect an FC packet in incoming packets received through an input interface from a first network device and to pass the FC packet passively to an output interface of the MACsec device. This pass-through of the FC packet can enable end-to-end flow control directly between the first network device and a second network device between which the MACsec device is communicatively coupled. In other words, the MACsec device need not act on the FC packet, but merely detect the FC packet and pass the FC packet along to the intended destination network device, which will then instead act on the FC packet.

Aspects and embodiments of the present disclosure can differ in how the FC packet pass-through is implemented. In at least one embodiment, the bypass FC circuitry forwards the FC packet to the output interface without altering the FC packet. In another embodiment, the FC circuitry passes the FC circuitry as a data packet through MACsec circuitry, which can authenticate the data packet and optionally encrypt or decrypt the FC packet. In this way, flow control continues to function between the network devices without the significant overhead costs of a buffer required for each MACsec device. Further, avoiding flow control at the MACsec devices improves network speeds, effectively avoiding another FC bottleneck at each MACsec circuit or device in a network path. These improvements provide significant savings in hardware, costs, and network speeds, all of which contribute to a more effective and efficient end-to-end network design.

Figure 1A:
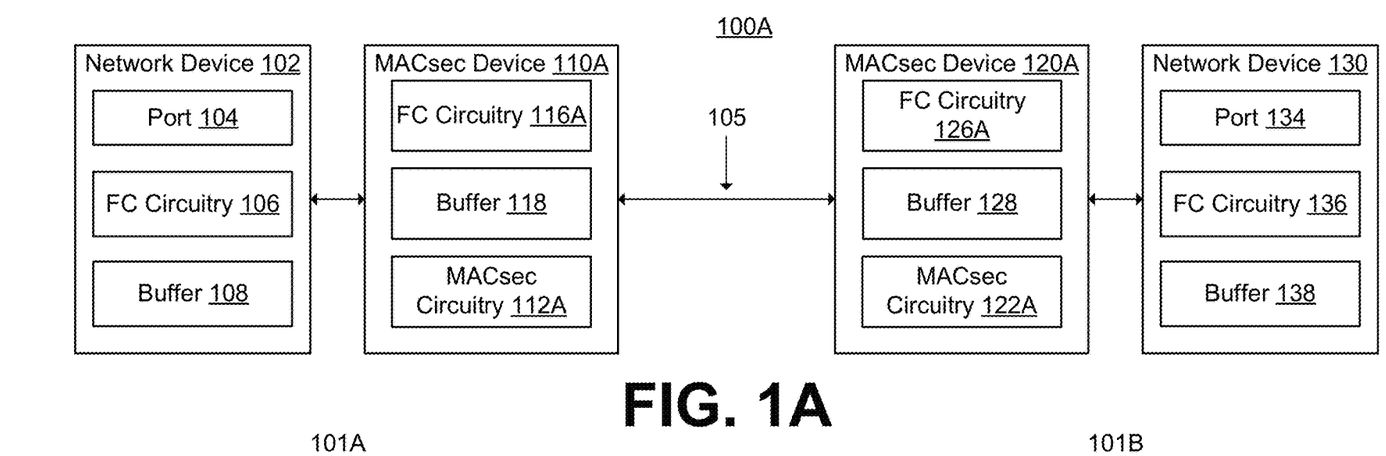
FIG. 1A is a network diagram of a network including a pair of communicating network devices that are enhanced with a respective pair of media access control security (MACsec) devices, all of which include a buffer for flow control, in accordance with at least some embodiments.

FIG. 1A is a network diagram of a network 100A including a pair of communicating network devices that are enhanced with a respective pair of MACsec devices, all of which include a buffer for flow control, in accordance with at least some embodiments. More specifically, the network 100A includes a first network device 102 coupled to a first MACsec device 110A, which is in turn coupled to a second MACsec device 120A, which is coupled to a second network device 130. Communication can flow in both directions between the first network device 102 and the second network device 130, where the first MACsec device 110A and the second MACsec device 120A are intermediate network devices used to secure communication between the first and second network devices 102 and 130. The network 100A can further include a network link 105 (whether wired or wireless) between the first and second MACsec devices 110A and 120A, which can be over a relatively large distance in some embodiments. Network links 105 can typically be implemented with twisted-pair cable or optical fiber cable.

In these embodiments, the first network device 102 includes a port 104, flow-control (FC) circuitry 106, and a buffer 108. The port 104 can be an output port that communicates over the network 100A with the first MACsec device 110A. The FC circuitry 106 can be adapted to send FC codes with FC packets in order to communicate with connected network devices, which in this embodiment, is the first MACsec device 110A. When the first network device 102 is receiving packets from the first MACsec device 110A, the FC circuitry 106 can cause received network packets to be buffered in the buffer 108 according to an FC protocol. In some embodiments, the FC protocol refers to software flow control. In other embodiments, the FC protocol is one of the IEEE 802.3x standard or a priority-based flow control as defined in the 802.1Qbb standard.

Further, the second network device 130 includes a port 134, flow-control (FC) circuitry 136, and a buffer 138. The port 134 can be an output port that communicates over the network 100A with the second MACsec device 120A. The FC circuitry 136 can be adapted to send FC codes with FC packets in order to communicate with connected network devices, which in this embodiment, is the second MACsec device 120A. When the second network device 130 is receiving packets from the second MACsec device 120A, the FC circuitry 136 can cause received network packets to be buffered in the buffer 138 according to the FC protocol.

In these embodiments, the first MACsec device 110A includes FC circuitry 116A, a buffer 118, and MACsec circuitry 112A. The FC circuitry 116A and the buffer 118 can function similarly to the FC circuitry 106 and the buffer 108, which were already explained with reference to the network device 102. Further, the second MACsec device 120A includes FC circuitry 126A, a buffer 128, and MACsec circuitry 122A. The FC circuitry 126A and the buffer 128 can function similarly to the FC circuitry 106 and the buffer 108, which were already explained with reference to the network device 102. As discussed previously, there are disadvantages to the first and second MACsec devices 110A and 120A performing flow control and buffering network packets in having to employ increasingly larger buffers.

In at least some embodiments, the MACsec circuitry 112A of the first MACsec device 110A can further authenticate and optionally encrypt network packets received from the first network device 102 before sending the encrypted network packets to the second MACsec device 120A over the network link 105. The MACsec circuitry 122A of the second MACsec device 120A can authenticate and optionally decrypt network packets received from the first MACsec device 110A before sending the secure network packets to the second network device 130. Similarly, if the second network device 130 is responding to or sending its own network packets to the first network device 102, the MACsec circuitry 122A of the second MACsec device 120A can perform the encryption of the network packets while the MACsec circuitry 112A of the first MACsec device 110A can perform decryption of the network packets before sending the secure network packets to the first network device 102.

Figure 1B:
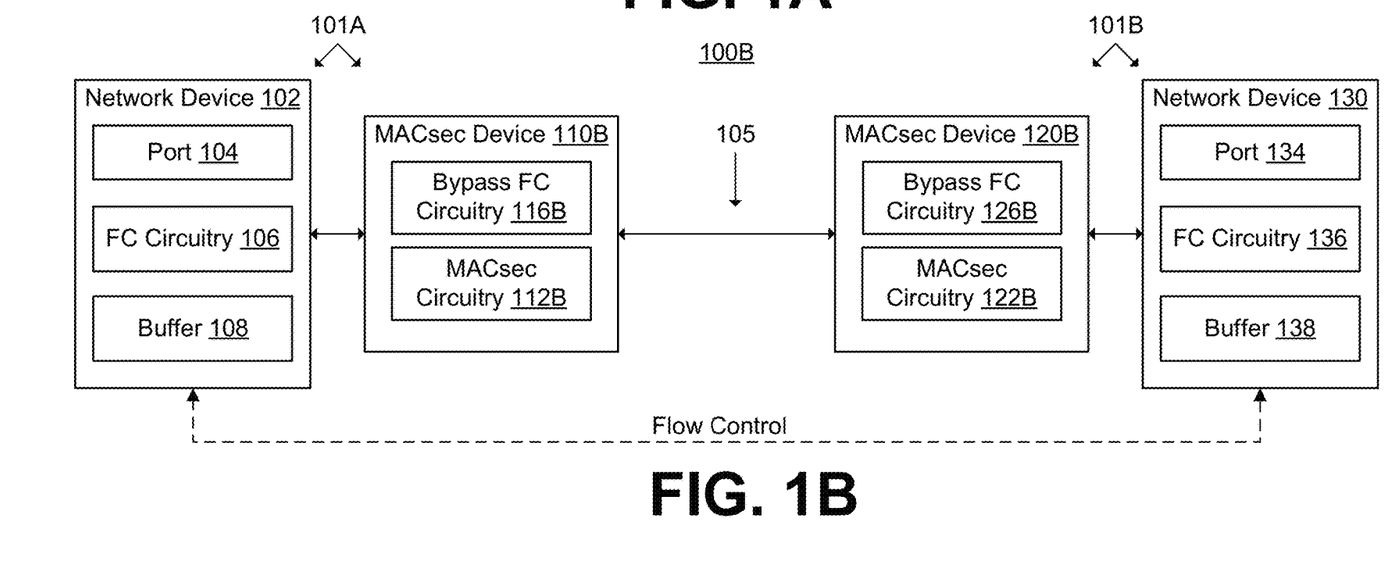
FIG. 1B is a network diagram of a network including a pair of communicating network devices that are enhanced with a respective pair of MACsec devices, in which the buffers are eliminated from the MACsec devices in accordance with at least some embodiments.

FIG. 1B is a network diagram of a network 100B including a pair of communicating network devices that are enhanced with a respective pair of MACsec devices, in which the buffers are eliminated from the MACsec devices in accordance with at least some embodiments. In these at least some embodiments, for example, the network 100B includes the first network device 102 and the second network device 130 as in FIG. 1A, but now includes a first MACsec device 110B and a second MACsec device 120B, which have eliminated the buffers 118 and 128, respectively. In one embodiment, the first network device 102 is combined with the first MACsec device 110B to generate a first MACsec-enabled network device 101A and the second network device 130 is combined with the second MACsec device 120B (or system) to generate a second MACsec-enabled network device 101B (or system). In various embodiments, the first MACsec device 110B now excludes the buffer 118, and instead includes bypass FC circuitry 116B and MACsec circuitry 112B. Further, the second MACsec device 120B now excludes the buffer 128, but includes bypass FC circuitry 126B and MACsec circuitry 122B.

In these embodiments, assume the first network device 102 is acting as the transmitting network device (although the second network device 130 can also transmit as well when communicating back to the first network device 102). The first network device 102, when transmitting, can already add an inter-packet gap (IPG) in accordance with IEEE 802.3 protocol, e.g., a 12-byte gap, which is adaptable. This standard IPG can enable rate adaptation, clock tolerance, and high quality-of-service in an Ethernet-based network by providing some flexibility in packet length. The MACsec circuitry, however, can be expected to also add an additional number of bytes of IPG (e.g., between 24 bytes and 32 bytes) to network packets in order to provide a security tag (usually 16 bytes) and an integrity check vector (ICV) (either 8 bytes or 16 bytes), as illustrated and discussed in more detail with reference to FIG. 2. Although an additional 24 bytes or 32 bytes are used by way of example, other numbers of bytes of IPG may be added for a different communication protocol or potential future changes to MACsec protocol, e.g., between 12 bytes and 56 bytes.

Thus, in at least some embodiments, to facilitate bypassing execution of flow control by the first MACsec circuitry 112B, the first network device 102 can add additional IPG, e.g., between 24 and 32 bytes depending on the length of the ICV added by the MACsec circuitry. This will enable the first MACsec circuitry 112B to perform security-related processing of the network packets without needing to buffer the network packets, and transmit the secure network packets over the network link 105 to the second MACsec device 120B. The second MACsec device 120B can do the same when transmitting network packets to the first MACsec device 110B. An example of the first and second network devices 102 and 130 will be discussed in more detail with reference to FIG. 3.

Further, by way of example, the first bypass FC circuitry 116B can skip flow control, e.g., not process the FC packets according to flow control (e.g., the FC protocol). For example, the first bypass FC circuitry 116 can be adapted to detect an FC packet in incoming packets received from the first network device 102 and pass the FC packet passively to an output of the MACsec device, e.g., on to the second MACsec device. This pass-through of the FC packet can enable end-to-end flow control directly between the first network device 102 and the second network device 130 (illustrated by the dashed line) between which the first MACsec device 110B is communicatively coupled. In other words, the first MACsec device 110B need not act on the FC packet, but merely detect the FC packet and pass the FC packet along to the intended destination network device, e.g., the second network device 130 in this example. The second MACsec device 120B can act similarly on a network packet from the second network device 130 being transmitted to the first network device 102 via the first MACsec device 110B. An example of the first and second MACsec devices 110B and 120B will be discussed in more detail with reference to FIG. 4.

In at least some embodiments, the outgoing packets from the first MACsec device 110B (or circuit) are to be sent through the second MACsec device 120B (or circuit) to the second network device 130 (or circuit). In these embodiments, the FC circuitry 106 of the first network device 102 (or circuit) is to, when receiving data packets and a second FC packet in return from the second network device 130 (or circuit), estimate an end-to-end latency of the data packets and the second FC packet that also determines a latency through the first MACsec device 110B and the second MACsec device 120B. By way of example, if the network link 105 is optical fiber, this latency is based on the length of the fiber cable and the speed of light through the optical fiber. Thus, according to the latency (or time) and bandwidth, the first network device 102 can determine how much of the buffer is required. For example, a 1 microsecond (µs) latency at 100 gigabits-per-second (Gpbs) would require a little more than 100 Kbit buffer space. The FC circuitry 106 can then provision this amount of calculated buffer space in the buffer 108 to perform flow control on the data packets and the second FC packet upon receipt, for example.

Figure 2:
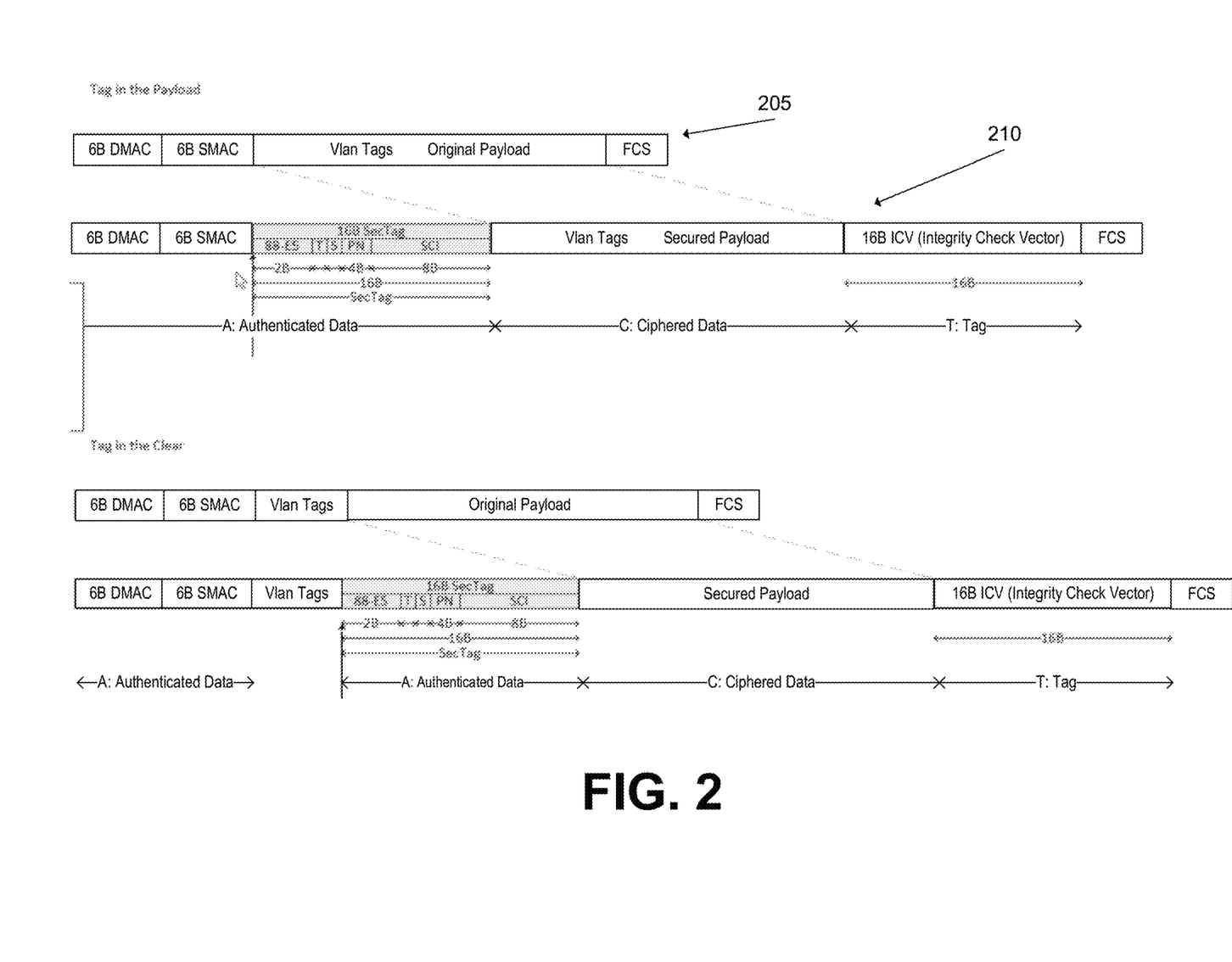
FIG. 2 is a set of network packet diagrams illustrating MACsec functionality, in accordance with at least some embodiments.

FIG. 2 is a set of network packet diagrams illustrating MACsec functionality, in accordance with at least some embodiments. The top set of network diagrams illustrate virtual local area network (Vlan) tags in the payload of a first network packet 205. A second network packet 210, which is illustrated below the first network packet 205, can include authenticated data, ciphered data, and tag data after MACsec circuitry has processed the first network packet 205. The bottom set of network diagrams illustrate the Vlan tags being located in the clear within the network packet, but are otherwise similar to the first network packet 205 and the second network packet 210.

In at least some embodiments, part of the authenticated data includes a 16-byte security tag (SecTag) and the tag data is a 16-byte integrity check vector (ICE), which can also be 8-bytes in size in some embodiments. The security tag can enable authentication of the network packet while the ICV can enable an integrity check of the network packet, which can be checked by receiving MACsec circuitry to ensure that the data of the packet was not compromised while traversing the network link 105. If the data integrity check detects anything irregular about a received network packet, the network packet can be dropped. In this way, MACsec processing on a network packet can increase the size of the packet by between 24 bytes (16B+8B) and 32 bytes (16B+16B).

Each network packet, once processed, also includes ciphered data, as explained. Encryption can ensure that the data in the Ethernet frame cannot be viewed by another device monitoring network traffic on the network link 105. This encryption is optional, as the MACsec circuitry can be enabled to ensure the data integrity checks are performed while still sending unencrypted data in the clear over the MACsec-secured network link 105.

Figure 3:
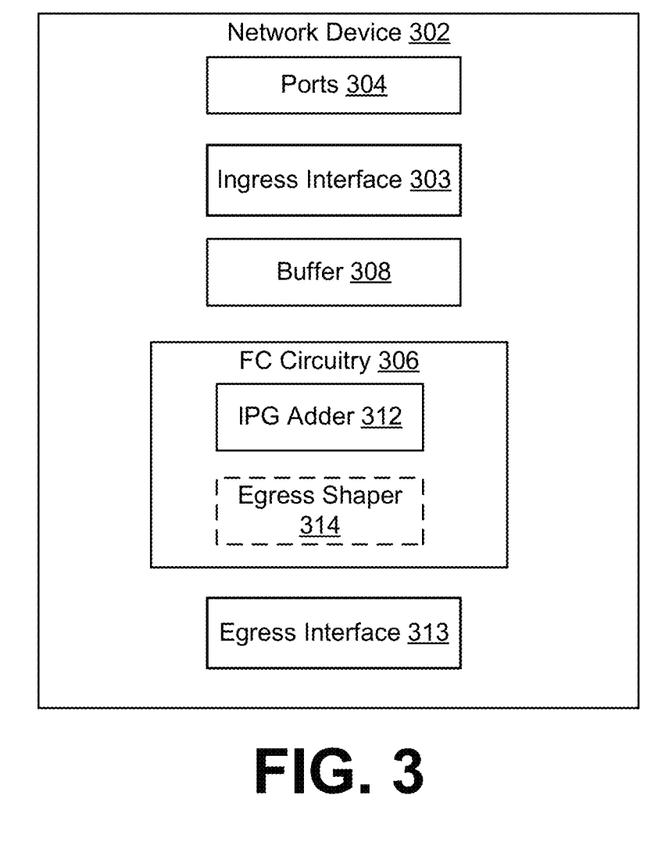
FIG. 3 is a block diagram of a network device, in accordance with at least some embodiments.

FIG. 3 is a block diagram of a network device 302, in accordance with at least some embodiments. In these embodiments, the network device 302 includes one or more ports, an ingress interface 303, a buffer 308, FC circuitry 306, and an egress interface 313. In one embodiment, the network device 302 is either of the first network device 102 or the second network device 130 illustrated in FIG. 1B. In some embodiments, the network device 302 includes many more components than those illustrated. In one embodiment, the network device 302 is an application-specific integrated device (ASIC) or other programmable devices.

In at least some embodiments, the one or more ports 304 include at least one input port for incoming network communication and at least one output port for outgoing network communication. The input port can be coupled to the ingress interface 303, which can parse and direct incoming network packets. The output port can be coupled to the egress interface 313 to direct outgoing network packets to a proper destination. As discussed previously, when incoming network packets arrive at a rate beyond which the network device 302 can handle in terms of parsing, processing, and routing the packet to an appropriate destination, the network device 302 can temporarily store the packets in the buffer 308. Once the buffer 308 is nearly full, the FC circuitry 306 can send a transmit-off code (e.g., XOFF) to the transmitting network device to stop transmission while the network device 302 handles the buffered network packets. Once the buffer 308 is emptied (or nearly emptied), the FC circuitry can send a transmit-on code (e.g., XON) to the transmitting network device to resume transmission and again buffering incoming network packets in the buffer 308.

In at least some embodiments, the FC circuitry 306 includes an IPG adder 312, which can not only add the standard IEEE 802.3 IPG, but also the additional IPG of 24 to 32 bytes to account for the additional security tag and ICV tag the MACsec circuitry will add, as discussed with reference to FIG. 2. In at least one other embodiment, the FC circuitry 306 includes an egress shaper 314 to reduce the rate of transmission of network packets leaving the network device 302 in lieu of adding additional IPG. For example, instead of transmitting at 100 gigabytes (GB), the egress shaper 314 can cause the network device 302 to transmit at 90 GB. The change in rate may depend on the size of the network packets, but will generally be determined according to the smallest-sized packets. Thus, the use of the egress shaper 314 may be practically viable where the packets are relatively similar in size, e.g., the smallest-sized packets are not that small compared to the largest-sized packets. In this way, the FC circuitry 306 either adds additional gaps (e.g., IPG) between the packets or modifies the transmission rate to account for the additional bytes added by the MACsec circuitry.

Figure 4:
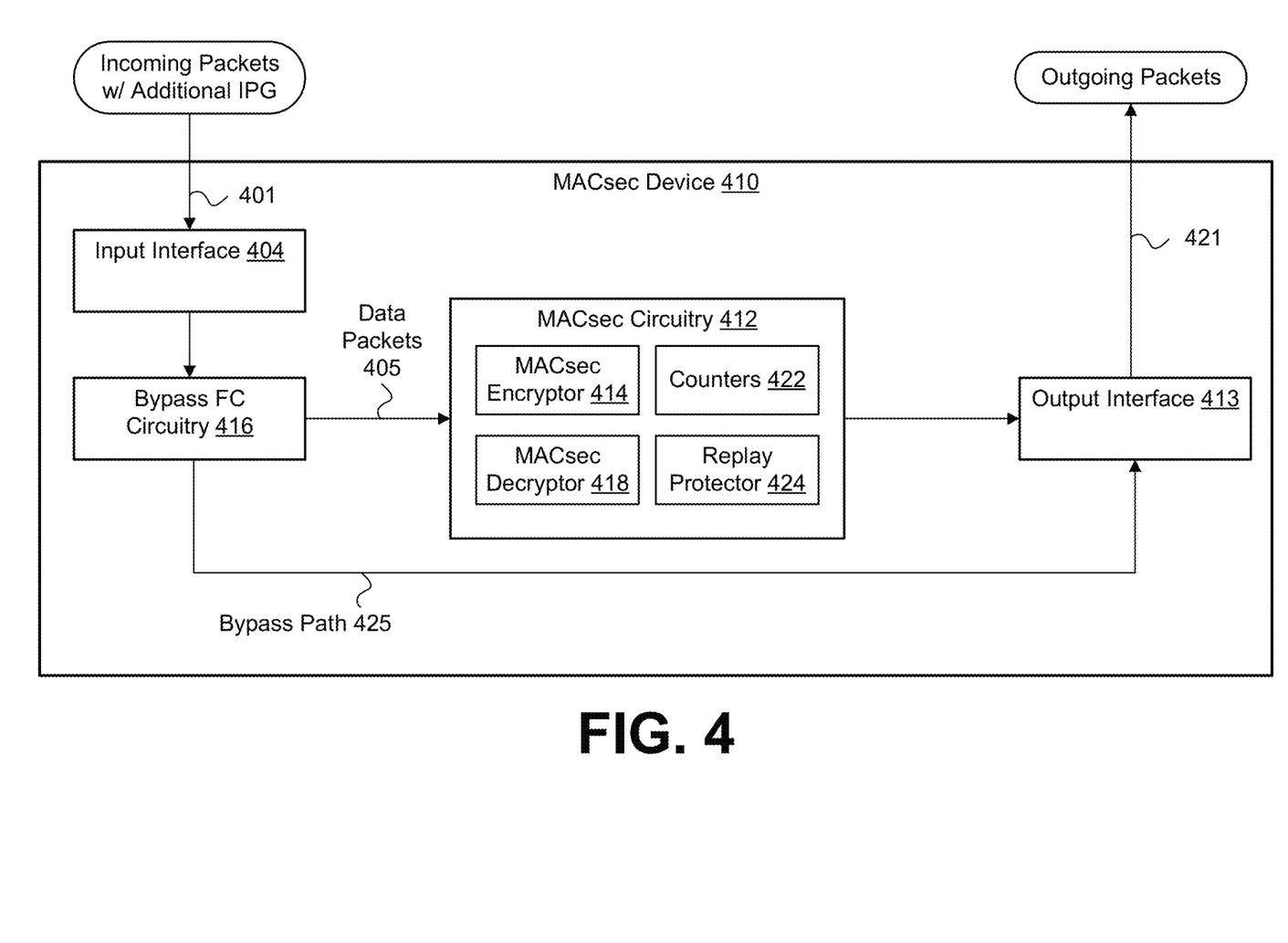
FIG. 4 is a block diagram of a MACsec device, in accordance with at least some embodiments.

FIG. 4 is a block diagram of a MACsec device 410, in accordance with at least some embodiments. In some embodiments, the MACsec device 410 is any of the first MACsec device 110B or the second MACsec device 120B of FIG. 1B. In some embodiments, the MACsec device 410 is a MACsec circuit (such as an IC) integrated within a network device, such as the network device 302 of FIG. 3.

In at least some embodiments, the MACsec device 410 includes an input interface 404, bypass FC circuitry 416, MACsec circuitry 412, and an output interface 413. The input interface 404 can be coupled to an incoming network link 401 over which the MACsec device 410 receives network packets that include additional IPGs, e.g., which are added by the network device 302. The input interface 404 is further coupled to the bypass FC circuitry 416. The FC circuitry 416 can be coupled to at least two different paths to which the bypass FC circuitry can pass FC packets, either a data packets path 405 or a bypass path 425. Once the FC packets bypass flow control, the FC packets can be transmitted via the output interface 413, e.g., over an outgoing network link 421 to a destination network device.

More specifically, in at least some embodiments, the bypass FC circuitry 412 is coupled between the input interface 404 and the MACsec circuitry 412 and also between the input interface 404 and the output interface 413. The bypass FC circuitry 416 can be configured to detect an FC packet in the incoming transmission packets and to pass the FC packet passively to the output interface 413 to enable end-to-end flow control directly between, e.g., the first network circuit 102 and the second network circuit 130. The FC packet can be one of a command to stop sending data, a command to resume sending data, or a credit associated with credit-based flow control, such as used in flow-controlled automated tell machine (ATM) networks, virtual circuit (VC) buffers, or the like.

In at least some embodiments, the bypass FC circuitry 416 parses the FC packet to identify the FC packet and passes the FC packet passively to the output interface 413, e.g., without performing flow control on the parsed FC packet. In one embodiment, the bypass FC circuitry 416 forwards the FC packet directly to the output interface on the bypass path 425. In another embodiment, the bypass FC circuitry 416 is to pass the FC packet to the MACsec circuitry 412 as a data packet. In this embodiment, the MACsec circuitry 412 can perform authentication, integrity checks, and optional encryption or decryption on the FC packet, which is thus treated as any other data packet.

In at least some embodiments, the MACsec circuitry 412 includes a MACsec encryptor 414, a MACsec decryptor 418, a set of counters 422, and a replay protector 424, all of which can be hardware. In one embodiment, the MACsec encryptor 414 and the MACsec decryptor 418 are combined into a single encryption/decryption engine. The MACsec encryptor 414 and MACsec decryptor 418 can be employed to generate the ICV tag for purposes of an integrity check and the replay protector 424 can add to the security tag (discussed with reference to FIG. 2) in order to provide replay protection. The MACsec encryptor 414 can optionally encrypt the FC packet before sending a secure FC packet to the output interface 413. If the FC packet is already encrypted, the MACsec decryptor 418 can decrypt the secure FC packet to generate an unencrypted packet. As discussed previously, the encryption or decryption is optional. Thus, the MACsec circuitry 412 can encrypt or decrypt the FC packet to provide point-to-point encryption between the first network circuit and the second network circuit of the FC packet. The MACsec circuitry 412 can include additional components and functionality, but is illustrated in a simplistic form for purposes of explanation.

Figure 5:
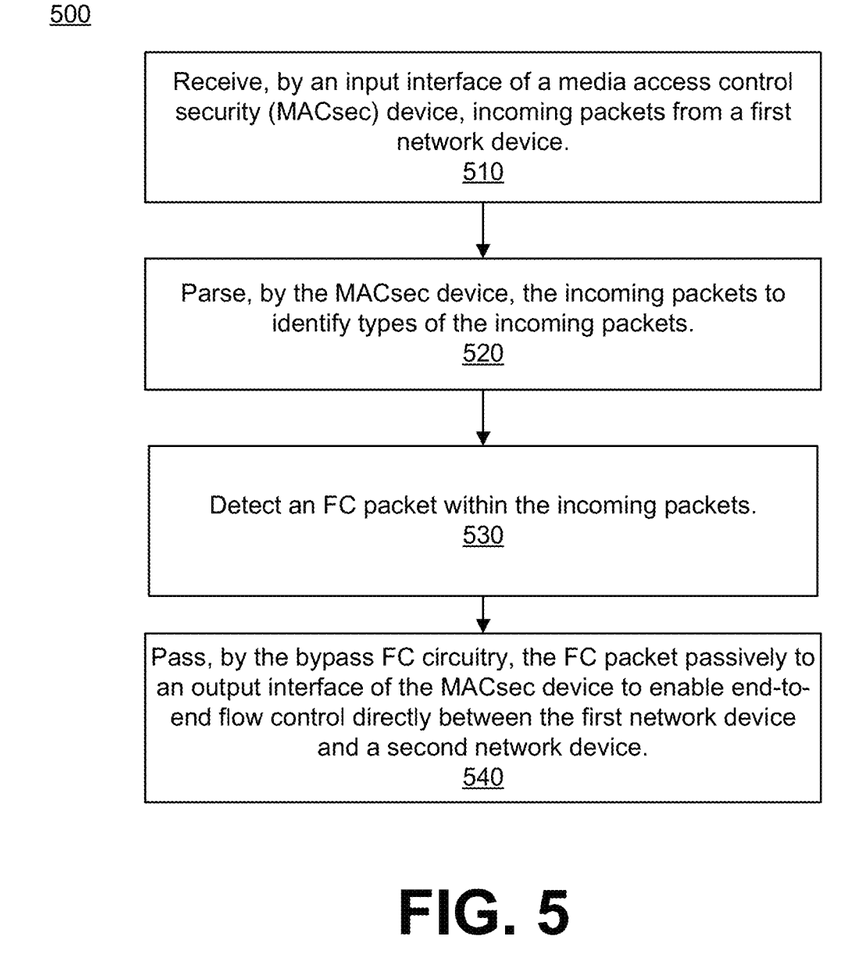
FIG. 5 is a flow diagram of a method for eliminating a MACsec from control flow within an end-to-end network path, in accordance with at least some embodiments.

FIG. 5 is a flow diagram of a method 500 for eliminating a MACsec from control flow within an end-to-end network path, in accordance with at least some embodiments. The method 500 can be performed by processing logic comprising hardware, software, firmware, or any combination thereof. In at least one embodiment, the method 500 is performed by the MACsec device 110B of FIG. 1 or the MACsec device 410 of FIG. 4. In at least one embodiment, the method 500 is performed by the MACsec circuitry 412 and/or the bypass FC circuitry 316 of FIG. 3.

At operation 510, the processing logic receives, via an input interface of a media access control security (MACsec) device, incoming packets from a first network device. In some embodiments, the first network device adds an additional interpacket gap between the incoming packets, where each additional interpacket gap is between 24 and 32 bytes, and transmits, to the MACsec device, a data stream in which the incoming packets includes data packets, the FC packet, and multiple interpacket gaps between each of the data packets and the FC packet.

At operation 520, the processing logic parses the incoming packets to identify the types of incoming packets. At operation 530, the processing logic detects an FC packet within the incoming packets, which have been parsed. For example, the FC packet can contain a code or a command to stop sending data, a command to resume sending data, or a credit associated with credit-based flow control.

At operation 540, the processing logic passes the FC packet passively to an output interface of the MACsec device to enable end-to-end flow control directly between the first network device and a second network device that is coupled with the output interface. In one embodiment, to pass the FC packet passively to the output interface of the MACsec device, the processing logic forwards the FC packet directly to the output interface on a bypass path coupled between the bypass FC circuitry and the output interface. In another embodiment, to pass the FC packet passively to the output interface of the MACsec device, the processing logic passes the FC packet to the MACsec circuitry as a data packet. The MACsec circuitry can then process the FC packet as any other packet to generate a secure FC packet for transmission.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An apparatus comprising:
   an input interface to receive incoming packets from a first network device;
   an output interface to send outgoing packets to a second network device;
   media access control security (MACsec) circuitry coupled between the input interface and the output interface; and
   bypass flow-control (FC) circuitry coupled between the input interface and the output interface, wherein the bypass FC circuitry is to detect multiple FC packets interspersed among the incoming packets and to pass the multiple FC packets to the output interface, and wherein the multiple FC packets are to cause end-to-end flow control directly between the first network device and the second network device.

2. The apparatus of claim 1, wherein to pass the FC packet, the bypass FC circuitry is to pass the multiple FC packets passively to the output interface.

3. The apparatus of claim 1, further comprising a bypass path coupled between the bypass FC circuitry and the output interface, wherein, to pass the multiple FC packets to the output interface, the bypass FC circuitry is to forward multiple FC packets directly to the output interface on the bypass path.

4. The apparatus of claim 1, wherein, to pass the multiple FC packets to the output interface, the bypass FC circuitry is to pass the multiple FC packets to the MACsec circuitry as a data packet.

5. The apparatus of claim 4, wherein the MACsec circuitry is to one of encrypt or decrypt the multiple FC packets to provide point-to-point encryption of the multiple FC packets between the first network device and the second network device.

6. The apparatus of claim 1, wherein, to detect the multiple FC packets, the bypass FC circuitry is to parse the multiple FC packets to identify the multiple FC packets, and to pass the multiple FC packets passively to the output interface, the bypass FC circuitry does not perform flow control on the parsed multiple FC packets.

7. The apparatus of claim 1, wherein each of the multiple FC packets is one of a command to stop sending data, a command to resume sending data, or a credit associated with credit-based flow control.

8. A system comprising:
   a first network circuit to add an additional interpacket gap between transmission packets; and
   a media access control security (MACsec) circuit coupled with the first network circuit, wherein the MACsec circuit comprises:
   an input interface to receive the transmission packets from the first network circuit;
   an output interface to send outgoing packets to a second network circuit;
   MACsec circuitry coupled between the input interface and the output interface; and bypass flow-control (FC) circuitry coupled between the input interface and the output interface, wherein the bypass FC circuitry is to detect multiple FC packets interspersed among the transmission packets and to pass the multiple FC packets to the output interface, and wherein the multiple FC packets are to cause end-to-end flow control directly between the first network circuit and the second network circuit.

9. The system of claim 8, wherein the first network circuit comprises a buffer to temporarily store the transmission packets and FC circuitry to perform flow control on the transmission packets.

10. The system of claim 8, wherein the additional interpacket gap is between 12 and 56 bytes.

11. The system of claim 8, wherein to pass the multiple FC packets, the bypass FC circuitry is to pass the multiple FC packets passively to the output interface.

12. The system of claim 8, wherein the MACsec circuit further comprises a bypass path coupled between the bypass FC circuitry and the output interface, wherein, to pass the multiple FC packets to the output interface, the bypass FC circuitry is to forward the multiple FC packets directly to the output interface on the bypass path.

13. The system of claim 8, wherein, to pass multiple FC packets to the output interface, the bypass FC circuitry is to pass the FC packet to the MACsec circuitry as a data packet.

14. The system of claim 13, wherein the MACsec circuitry is to one of encrypt or decrypt the multiple FC packets to provide point-to-point encryption of the FC packet between the first network circuit and the second network circuit.

15. The system of claim 8, wherein, to detect the multiple FC packets, the bypass FC circuitry is to parse the multiple FC packets to identify the multiple FC packets, and to pass the multiple FC packets to the output interface, the bypass FC circuitry does not perform flow control on the parsed multiple FC packets.

16. The system of claim 8, wherein each of the multiple FC packets is one of a command to stop sending data, a command to resume sending data, or a credit associated with credit-based flow control.

17. The system of claim 8, wherein the outgoing packets are to be sent through a second MACsec circuit to the second network circuit, and wherein the first network circuit comprises FC circuitry that is to, when receiving data packets and a second FC packet in return from the second network circuit:

estimate an end-to-end latency of the data packets and the second FC packet that also determines a latency through the MACsec circuit and the second MACsec circuit; and provision an amount of buffer space in order to perform flow control on the data packets and the second FC packet upon receipt.

18. A method comprising:
receiving, by an input interface of a media access control security (MACsec) device, incoming packets received from a first network device;
parsing, by the MACsec device, the incoming packets to identify types of the incoming packets;
detecting, by bypass flow control (FC) circuitry coupled between the input interface and an output interface of the MACsec device, multiple FC packets interspersed within the incoming packets; and
passing, by the bypass FC circuitry, the multiple FC packets to the output interface of the MACsec device, wherein the multiple FC packets cause to end-to-end flow control directly between the first network device and a second network device that is coupled with the output interface.

19. The method of claim 18, further comprising:
adding, by the first network device, an additional interpacket gap between the incoming packets, wherein each additional interpacket gap is between 24 and 32 bytes; and
transmitting, to the MACsec device, a data stream in which the incoming packets comprise data packets, the multiple FC packets, and a plurality of interpacket gaps between each of the data packets and the multiple FC packets.

20. The method of claim 18, wherein passing the multiple FC packets comprises passing the multiple FC packets passively to the output interface.

21. The method of claim 18, wherein passing the multiple FC packets to the output interface of the MACsec device comprises forwarding the multiple FC packets directly to the output interface on a bypass path coupled between the bypass FC circuitry and the output interface.

22. The method of claim 18, wherein passing the multiple FC packets to the output interface of the MACsec device comprises passing the multiple FC packets to MACsec circuitry of the MACsec device as a data packet, the method further comprising one of encrypting or decrypting, using the MACsec circuitry, the multiple FC packets.

* * * * *